US011913366B2

(12) United States Patent
La Sana et al.

(10) Patent No.: US 11,913,366 B2
(45) Date of Patent: Feb. 27, 2024

(54) HEATING DEVICE FOR AN EXHAUST SYSTEM OF AN INTERNAL COMBUSTION ENGINE

(71) Applicant: MARELLI EUROPE S.P.A., Corbetta (IT)

(72) Inventors: Marco La Sana, Turin (IT); Emanuele Milani, Sandigliano (IT); Mauro Brignone, Turin (IT); Luigi Lubrano, Novara (IT)

(73) Assignee: MARELLI EUROPE S.P.A., Corbetta (IT)

( * ) Notice: Subject to any disclaimer, the term of this patent is extended or adjusted under 35 U.S.C. 154(b) by 36 days.

(21) Appl. No.: 17/558,720

(22) Filed: Dec. 22, 2021

(65) Prior Publication Data

US 2022/0243633 A1     Aug. 4, 2022

(30) Foreign Application Priority Data

Jan. 29, 2021   (IT) ................. 102021000001871

(51) Int. Cl.
*F01N 3/20* (2006.01)
*F01N 13/00* (2010.01)

(52) U.S. Cl.
CPC ......... *F01N 3/2033* (2013.01); *F01N 13/008* (2013.01); *F01N 2560/06* (2013.01)

(58) Field of Classification Search
CPC ... F01N 2240/14; F01N 3/0256; F01N 3/2033
See application file for complete search history.

(56) References Cited

U.S. PATENT DOCUMENTS 3,070,150 A * 12/1962 Hunter ................. F23D 11/105
                                                       431/263
5,284,016 A *  2/1994 Stark ....................... F01N 9/00
                                                        60/303

(Continued)

FOREIGN PATENT DOCUMENTS

EP       0590699 A1    4/1994
EP       0631039 A1   12/1994

(Continued)

OTHER PUBLICATIONS

Search Report for Italian Patent Application No. 202100001871 dated Sep. 20, 2021.

*Primary Examiner* — Anthony Ayala Delgado
(74) *Attorney, Agent, or Firm* — Howard & Howard Attorneys PLLC

(57) ABSTRACT

A heating device for an exhaust system of an internal combustion engine and having: a tubular body, where a combustion chamber is obtained on the inside; a fuel injector, which is designed to inject fuel into the combustion chamber; at least one inlet opening, which can be connected to a fan so as to receive an air flow, which is directed to the combustion chamber; a feeding channel, which receives air from the inlet opening, surrounds an end portion of the fuel injector and ends with a nozzle, which is arranged around a spray tip of the fuel injector, from which fuel flows out; and a spark plug, which is mounted through a side wall of the tubular body. An axial distance, namely measured along a longitudinal axis of the tubular body, between the spray tip of the fuel injector and a longitudinal axis of the spark plug ranges from 33% to 100% of an inner diameter of the tubular body.

21 Claims, 8 Drawing Sheets

(56) References Cited

U.S. PATENT DOCUMENTS

| | | | | |
|---|---|---|---|---|
| 5,320,523 | A * | 6/1994 | Stark | F01N 3/2033 60/303 |
| 5,353,590 | A * | 10/1994 | Pettit | F01N 3/025 60/303 |
| 5,571,484 | A * | 11/1996 | Pettit | F01N 3/2033 422/177 |
| 7,980,069 | B2 * | 7/2011 | Arellano | F23D 91/02 60/297 |
| 8,006,487 | B2 | 8/2011 | Gaiser | |
| 8,656,708 | B2 * | 2/2014 | Morley | F01N 3/025 60/299 |
| 8,959,902 | B2 * | 2/2015 | Olivier | F01N 3/2033 60/303 |
| 8,991,157 | B2 * | 3/2015 | Mastbergen | F01N 3/025 60/303 |
| 9,027,331 | B2 * | 5/2015 | Olivier | F01N 3/38 60/299 |
| 9,027,332 | B2 * | 5/2015 | Olivier | F01N 11/00 60/303 |
| 11,506,136 | B1 * | 11/2022 | Harris | F01N 3/2066 |
| 2010/0319329 | A1 * | 12/2010 | Khadiya | F01N 3/0256 60/303 |
| 2011/0289906 | A1 | 12/2011 | Morley et al. | |
| 2012/0192551 | A1 * | 8/2012 | Morley | F01N 3/025 60/303 |

FOREIGN PATENT DOCUMENTS

| | | |
|---|---|---|
| EP | 1939419 A1 | 7/2008 |
| EP | 2387656 A1 | 11/2011 |
| JP | H07259535 A * | 3/1994 |
| JP | 2005180371 A | 7/2005 |
| WO | 2012139801 A1 | 10/2012 |

* cited by examiner

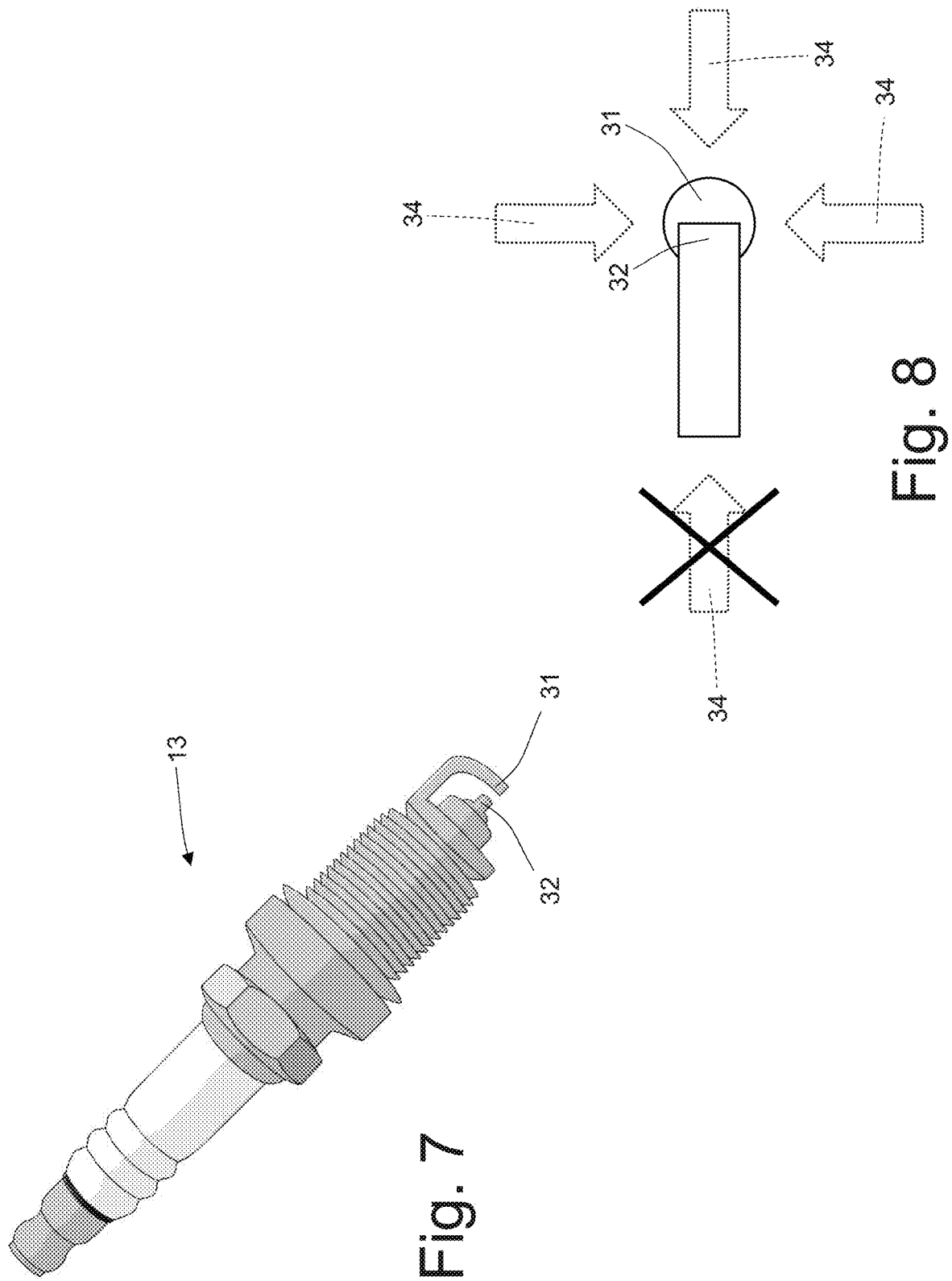

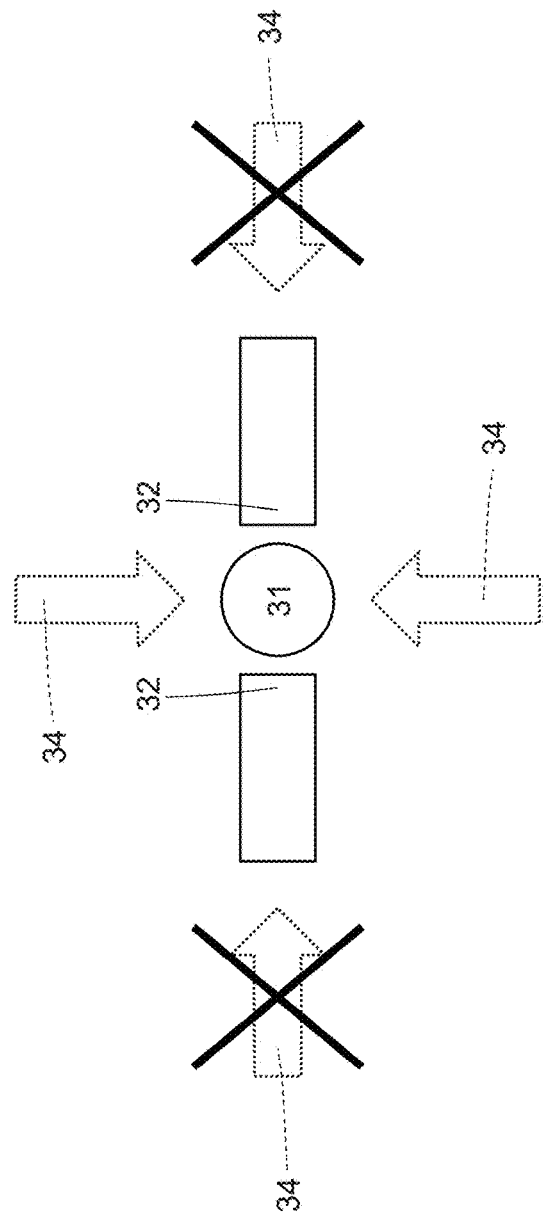
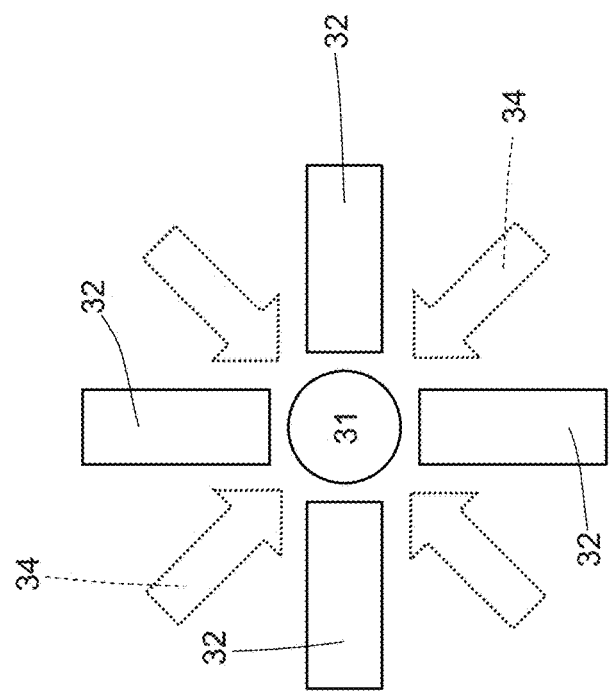

HEATING DEVICE FOR AN EXHAUST SYSTEM OF AN INTERNAL COMBUSTION ENGINE

CROSS-REFERENCE TO RELATED APPLICATIONS

This patent application claims priority from Italian patent application no. 102021000001871 filed on Jan. 29, 2021, the entire disclosure of which is incorporated herein by reference.

TECHNICAL FIELD

The invention relates to a heating device an exhaust system of an internal combustion engine.

BACKGROUND ART

An exhaust system of an internal combustion engine comprises an exhaust duct, along which there is installed at least one device for the treatment of the exhaust gases coming from the internal combustion engine; in particular, there always is a catalytic converter (either an oxidation catalytic converter or a reduction catalytic converter), to which a particulate filter can be added. The catalytic converter, in order to work (namely, in order to carry out a catalytic conversion), needs to operate at a relatively high operating temperature (a modern catalytic converter works at temperatures even close to 800° C.), since the chemical reactions for the conversion of unburnt hydrocarbons, nitrogen oxides and carbon monoxide into carbon dioxide, water and nitrogen take place only once the work temperature has been reached.

During a cold start phase (i.e. when the internal combustion engine is turned on after having been turned off for a long time, thus causing the temperature of the different components of the internal combustion engine to reach ambient temperature), the temperature of the catalytic converter remains, for a relatively long amount of time (even some minutes in winter and during a city travel, along which the internal combustion engine idles or runs very slow), significantly below the operating temperature. As a consequence, during the cold start phase, namely for the amount of time in which the catalytic converter has not reached its operating temperature yet, polluting emissions are very high, since the purification effect of the catalytic converter is close to zero or, anyway, is scarcely effective.

In order to speed up the reaching of the operating temperature of the catalytic converter, patent documents EP0631039A1, WO2012139801A1, U.S. Pat. No. 8,006,487B2, EP0590699A1, JP2005180371A1 and EP1939419A suggest installing, along the exhaust duct, a heating device, which, by burning fuel, generates a (very) hot air flow, which flows through the catalytic converter. In particular, the heating device comprises a combustion chamber, which is connected, at the outlet, to the exhaust duct (immediately upstream of the catalytic converter) and is connected, at the inlet, to a fan, which generates an air flow flowing through the combustion chamber; in the combustion chamber there also are a fuel injector, which injects fuel to be mixed with air, and a spark plug, which cyclically produces sparks to ignite the air-fuel mixture in order to obtain the combustion that heats the air.

In known heating devices, the combustion of fuel is not always complete in all operating conditions and, therefore, it can happen (especially when a large quantity of fuel is injected in order to develop a large quantity of heat) that unburnt fuel reaches the exhaust duct and burns inside the exhaust duct, thus locally determining sudden, unexpected and undesired temperature rises.

DESCRIPTION OF THE INVENTION

The object of the invention is to provide a heating device for an exhaust system of an internal combustion engine, said heating device permitting a complete fuel combustion (namely without introducing unburnt fuel into the exhaust duct) and, furthermore, being simple and economic to be manufactured.

According to the invention, there is provided a heating device for an exhaust system of an internal combustion engine according to the appended claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein:

FIG. 7 is a schematic view of a spark plug of the heating device of FIG. 1;

FIG. 8 is a schematic view of the electrodes of the spark plug of FIG. 5, highlighting possible directions of a fuel jet emitted by a fuel injector;

FIGS. 9 and 10 are schematic views of alternative embodiments of the electrodes of the spark plug of FIG. 7, highlighting possible directions of a fuel jet emitted by a fuel injector.

PREFERRED EMBODIMENTS OF THE INVENTION

Figure 1:
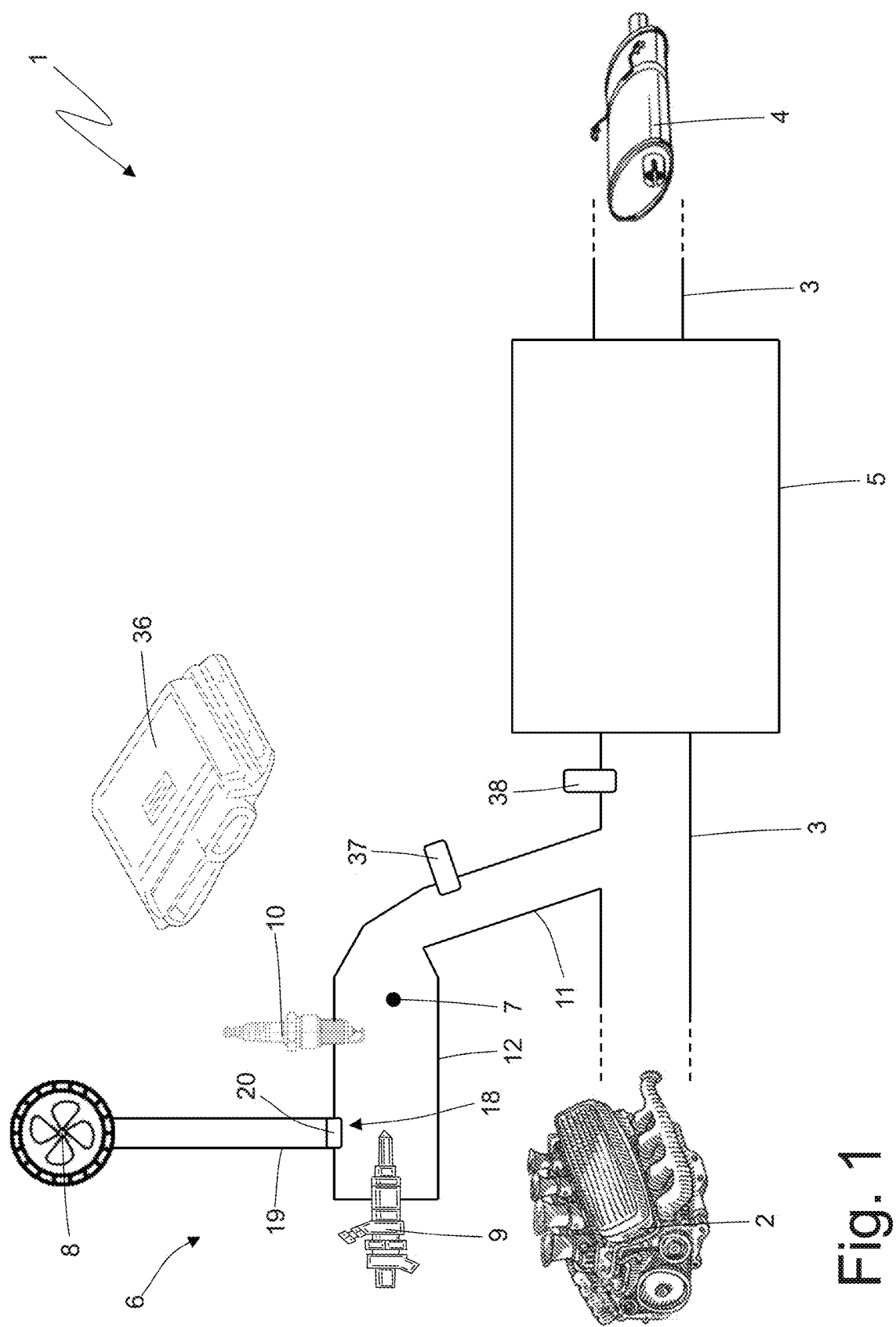
FIG. 1 is a schematic, partial view of an exhaust system of an internal combustion engine provided with a heating device according to the invention.

In FIG. 1, number 1 indicates, as a whole, an exhaust system of an internal combustion engine 2.

The exhaust system 1 comprises an exhaust duct 3, which originates from an exhaust manifold of the internal combustion engine 2 and ends with a silencer 4, from which exhaust gases are released into the atmosphere. Along the exhaust duct 3 there is installed at least one device 5 for the treatment of the exhaust gases coming from the internal combustion engine; in particular, there always is a catalytic converter (either an oxidation catalytic converter or a reduction catalytic converter), to which a particulate filter can be added. The catalytic converter, in order to work (namely, in order to carry out a catalytic conversion), needs to operate at a relatively high operating temperature (a modern catalytic converter works at temperatures even close to 800° C.), since the chemical reactions for the conversion of unburnt hydrocarbons, nitrogen oxides and carbon monoxide into carbon dioxide, water and nitrogen take place only once the work temperature has been reached.

In order to speed up the heating of the treatment device 5, namely in order to allow the treatment device 5 to reach its operating temperature more quickly, the exhaust system comprises a heating device 6, which, by burning fuel, generates a (very) hot air flow, which flows through the treatment device 5.

The heating device 6 comprises a combustion chamber 7, which is connected, at the outlet, to the exhaust duct 3 (immediately upstream of the treatment device 5) and is connected, at the inlet, to a fan 8 (namely, to an air pump), which generates an air flow flowing through the combustion chamber 7; in the combustion chamber 7 there also are a fuel injector 9, which injects fuel to be mixed with air, and a spark plug 10, which cyclically produces sparks to ignite the air-fuel mixture in order to obtain the combustion that heats the air. The combustion chamber 7 of the heating device 6 ends with an outlet duct 11, which leads into the exhaust duct 3 (immediately upstream of the treatment device 5).

Figure 2:
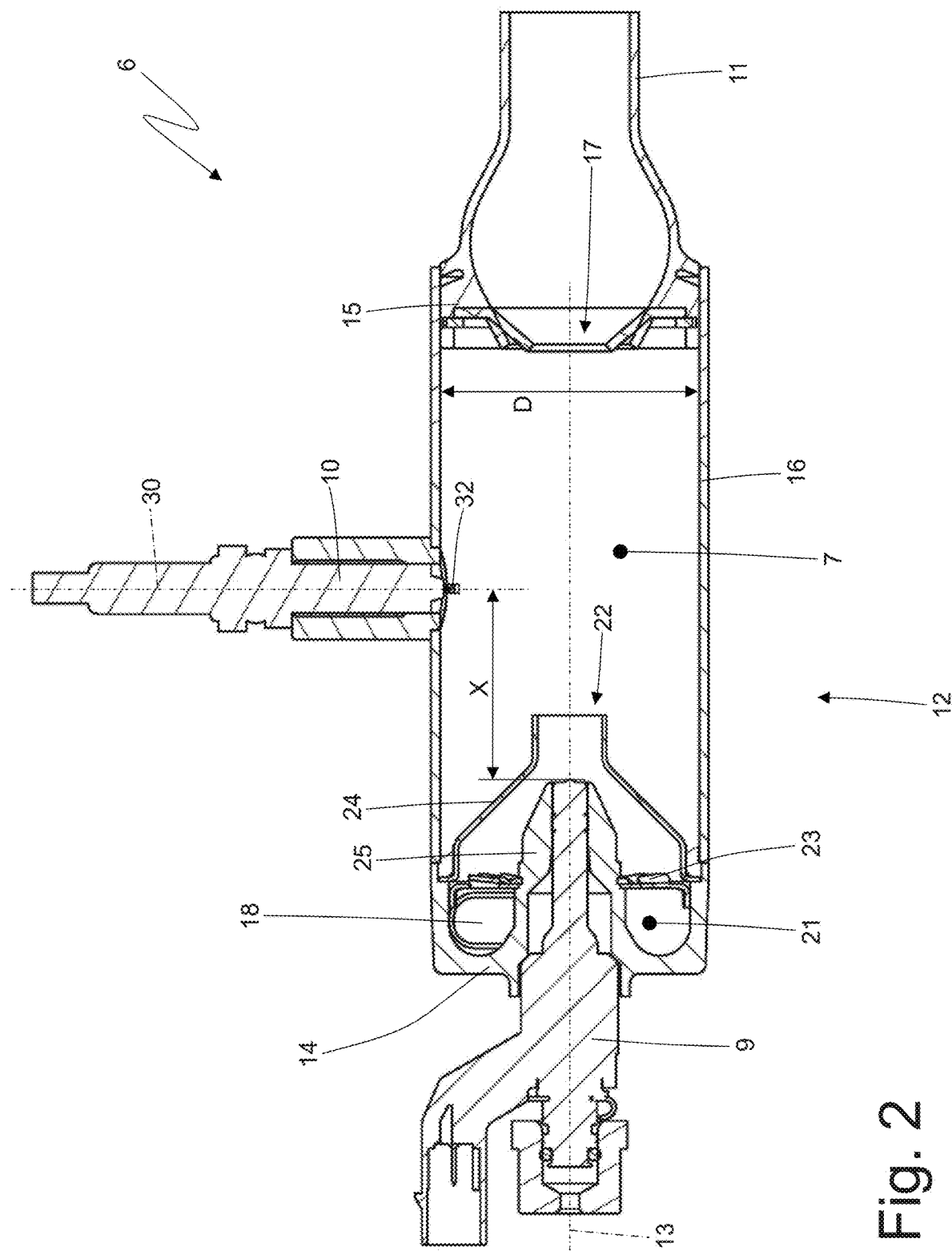
FIG. 2 is a schematic, longitudinal section view, with parts removed for greater clarity, of the heating device of FIG. 1.

According to FIG. 2, the heating device 6 comprises a tubular body 12 (for example, with a cylindrical shape and having a circular or elliptical cross section) having a longitudinal axis 13; the tubular body 12 is delimited, at the two ends, by two opposite base walls 14 and 15 and is laterally delimited by a side wall 16, which connects the two base walls 14 and 15 to one another. The base wall 14 is perforated at the centre so as to accommodate the fuel injector 9, which is mounted coaxially to the tubular body 12 (namely, coaxially to the longitudinal axis 13); in other words, the fuel injector 9 is mounted through the base wall 14 of the tubular body 12 so as to inject fuel into the combustion chamber 7.

Similarly, the base wall 15 is perforated at the centre so as to be fitted onto the outlet duct 11, which ends in the exhaust duct 3; namely, the base wall 15 has an outlet opening 17 to let hot air out of the combustion chamber 7 from which the outlet duct 11 originates.

According to FIG. 2, through the tubular body 12 there is obtained (at least) part of an inlet opening 18, which is connected to the fan 8 by means of an inlet duct 19 (shown in FIG. 1) in order to receive an air flow, which is directed towards the combustion chamber 7 and is mixed with the fuel injected by the fuel injector 9. Preferably, air flows into the inlet opening 18 with a flow that is oriented tangentially (relative to the tubular body 12), namely the inlet duct 19 is oriented tangentially (relative to the tubular body 12).

According to a possible, though non-binding embodiment shown in FIG. 1, in the area of the inlet opening 18 there is a non-return valve 20, which allows for an air flow only towards the combustion chamber 7 (namely, flowing into the tubular body 12). Preferably, the non-return valve 20 is passive (namely, does not comprise electric, hydraulic or pneumatic actuators generating a movement), is pressure-controlled and opens only when a pressure upstream of the non-return valve 20 is higher than a pressure downstream of the non-return valve 20. The function of the non-return valve 20 is that of preventing, when the heating device 6 is not used (namely, when the fan 8 is turned off), exhaust gases from flowing back until they flow out of the inlet opening 18 and, hence, are released into the atmosphere without going through the treatment device 5. Alternatively, the non-return valve 20 could be mounted along the outlet duct 11, for example in the area of the outlet opening 17; in this case, the non-return valve 20 allows air to only flow out of the combustion chamber 7 (out of the tubular body 12) towards the exhaust duct 3, namely it prevents exhaust gases from flowing from the exhaust duct 3 towards the combustion chamber 7 (into the tubular body 12).

According to FIG. 2, the heating device 6 comprises a feeding channel 21, which is entirely contained inside the tubular body 12, receives air from the inlet opening 18, surrounds an end portion of the fuel injector 9 and ends with a nozzle 22, which is arranged around an injection point of the fuel injector 9 (namely, around a spray tip of the fuel injector 9, from which fuel flows out).

The spark plug 10 is mounted through the side wall 16 of the tubular body 12 in order to trigger the combustion of an air and fuel mixture, which is obtained because of the mixing of air, which flows into the tubular body 12 from the inlet opening 18 and is introduced into the combustion chamber 7 by the nozzle 22 of the feeding channel 21, and fuel, which is injected into the combustion chamber 7 by the fuel injector 9. In particular, the side wall 16 of the tubular body 12 has a through hole, which is oriented radially (namely, perpendicularly to the longitudinal axis 13) and accommodates, on the inside (screwed into it), the spark plug 10 (which is obviously oriented radially).

The heating device 6 comprises a static mixer 23 (namely, without moving parts), which has the shape of an annulus, is arranged along the feeding channel 21 and around the fuel injector 9 and is configured to generate turbulences, in particular a swirling motion, in the air flowing towards the nozzle 22.

According to a preferred, though non-binding embodiment shown in the accompanying figures, downstream of the static mixer 23, the feeding channel 21 has a progressive reduction of the area of the cross section, so as to determine an increase in the air speed. In particular, downstream of the static mixer 23, the feeding channel 21 has an initial portion having a constant cross section area, an intermediate portion having a progressively decreasing cross section area and an end portion having a cross section area that is constant up to the nozzle 22.

The feeding channel 21 is delimited, on the outside, by an (at least partially conical) outer tubular body 24 and is delimited, on the inside, by an (at least partially conical) inner tubular body 25, which surrounds the fuel injector 9 and contains, on the inside, the fuel injector 9 (namely, serves as container for the end part of the fuel injector 9). Namely, the feeding channel 21 is defined between the inner tubular body 25 and the outer tubular body 24. In particular, the two tubular bodies 24 and 25 alternate conical portions (i.e. having a converging shape that progressively decreases its size) with cylindrical portions (i.e. having a shape with a constant size); preferably, the end part of the inner tubular body 25 has a converging taper (namely, which progressively reduces its size towards the nozzle 22), whereas the end part of the outer tubular body 24 has a cylindrical shape.

According to a preferred embodiment, air flows into the feeding channel 21 with a tangentially oriented flow so as to have a swirling motion (subsequently increased by the action of the static mixer 23), which helps it get mixed with the fuel injected by the fuel injector 9; in other words, the introduction of oxidizing air into the combustion chamber 7 through a duct oriented tangentially to the combustion chamber 7 allows the oxidizing air flow to gain a circular motion (further enhanced by the presence of the static mixer 23) so as to optimize the mixing of air and fuel inside the combustion chamber 7.

Figure 3:
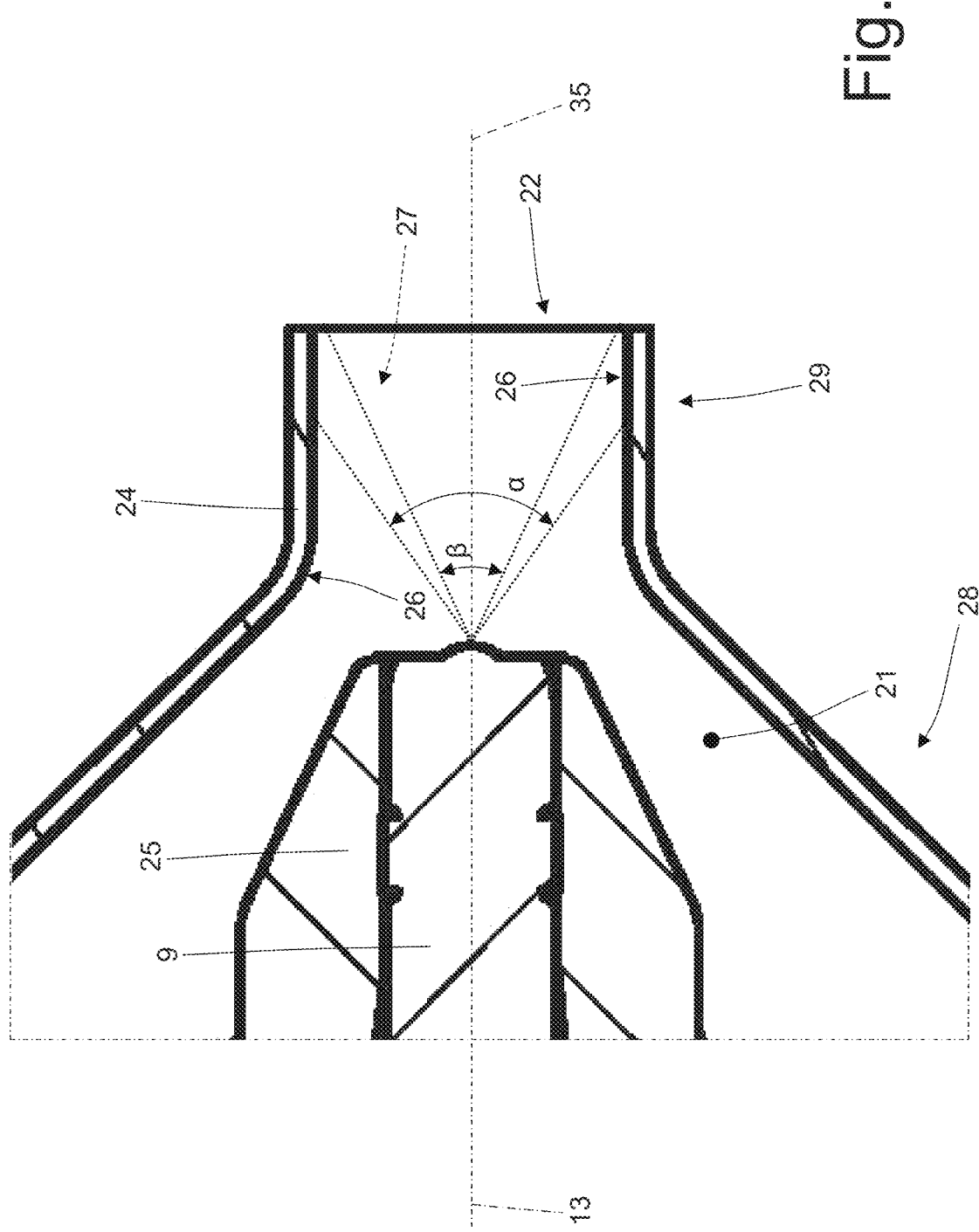
FIG. 3 is a view, on a larger scale, of a detail of FIG. 2.

According to FIG. 3, the fuel injector 9 is configured to spray at least 80% (and preferably at least 90-95%) of the fuel against an inner surface 26 of the feeding channel 21;

namely, the fuel injector 9 does not directly direct the fuel towards the outside of the feeding channel 21, but, on the contrary, directs the fuel against the inner surface 26 of the feeding channel 21, so that the fuel flowing out of the fuel injector 9 preliminarily hits the inner surface 26 before flowing out of the feeding channel 21 through the nozzle 22. The impact of the fuel against the inner surface 26 allows the fuel droplets emitted by the fuel injector 9 to be atomized in a very effective manner and, by so doing, the mixing of said fuel with the air flowing along the feeding channel 21 is significantly improved; an improvement in the mixing between air and fuel ensures an ideal and, especially, complete combustion of the fuel, thus preventing part of the unburnt fuel from flowing out of the combustion chamber 7.

According to a preferred embodiment, the fuel injector 9 is configured to emit a fuel jet 27 having a centrally hollow conical shape, namely having a cross section shaped like an annulus, in which fuel gathers in the periphery; in particular, according to the embodiment shown in FIG. 3, an outer surface of the fuel jet 27 has an opening angle α of approximately 70° (for example, ranging between 65° and) 75° and an inner surface of the fuel jet 27 has an opening angle β of approximately 50° (for example, ranging from 45° to 55°). In other words, the fuel injector 9 generates a fuel jet 27 having a conical shape (with the vertex of the cone close to the injection nozzle) and having, at the centre, a hole (namely, an area without fuel) also with a conical shape (with the vertex of the cone close to the injection nozzle); hence, the fuel jet 27 generated by the fuel injector 9 has the shape of a conical shell due to the presence of the central hole, namely has an internally hollow conical shape.

Figure 6:
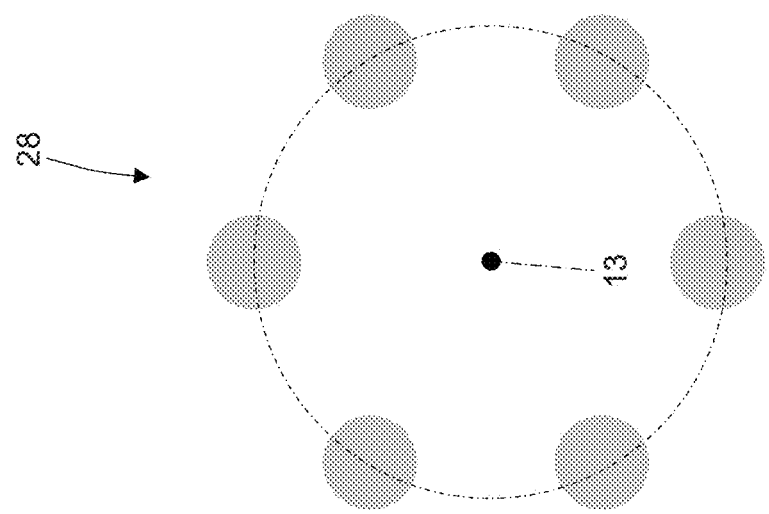
FIGS. 5 and 6 are two schematic views of alternative embodiments of a fuel jet generated by a fuel injector of the heating device of FIG. 1.
Figure 5:
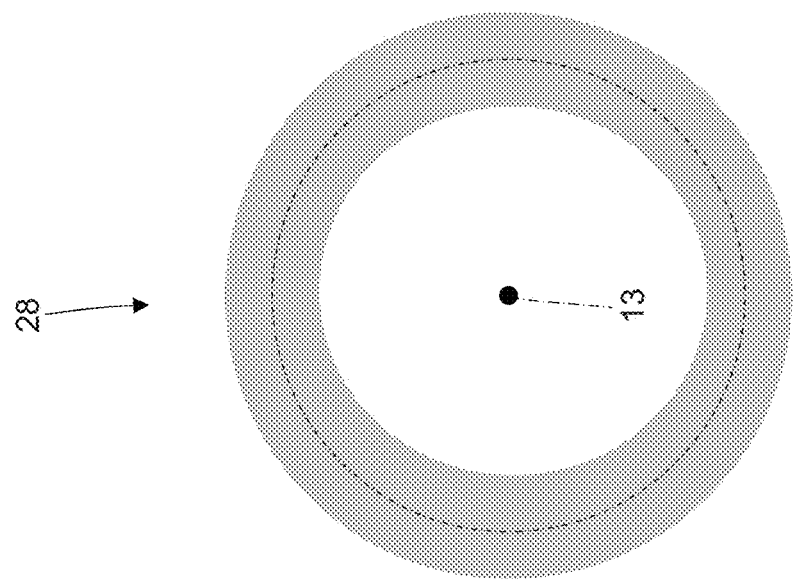

It should be pointed out that when we say that the fuel jet 27 generated by the fuel injector 9 has the shape of a conical shell (namely, has an internally hollow conical shape) we mean that the large majority of the fuel flowing out of the fuel injector 9 spreads in the space within a conical shell, but a very small (residual) part of the fuel can spread differently. Furthermore, depending on the how the fuel outlet opening is made, the fuel jet 27 flowing out of the fuel injector 9 can have a more symmetrical distribution around the longitudinal axis 13 (as shown in FIG. 5) or a less symmetrical distribution around the longitudinal axis 13 (as shown in FIG. 6). In particular, the fuel jet 27 flowing out of the fuel injector 9 has the conformation shown in FIG. 5 when the fuel injector 9 is of the "swirl" type, whereas the fuel jet 27 flowing out of the fuel injector 9 has the conformation shown in FIG. 6 when the fuel injector 9 is of the "multihole" type (FIG. 6 shows a "multihole" fuel injector 9 with six outlet holes, but the number of outlet holes could be different).

According to a preferred embodiment, the fuel injector 9 is of the "swirl" type, namely imparts a rotary swirling motion to the injected fuel (namely, a swirling motion in which fuel rotates around the longitudinal axis 13 of the tubular body 12).

As mentioned above, the feeding channel 21 is delimited, on the outside, by the outer tubular body 24 (having the inner surface 26 of the feeding channel 21) and is delimited, on the inside, by the inner tubular body 25, which surrounds the fuel injector 9 and contains, on the inside, the fuel injector 9.

According to FIG. 3, the outer tubular body 24 comprises a conical portion 28, which reduces its size towards the nozzle 22; furthermore, according to a preferred embodiment shown in the accompanying figures, the outer tubular body 24 also comprises a cylindrical portion 29, which is arranged downstream of the conical portion 28 and ends with the nozzle 22. According to a different embodiment which is not shown herein, the outer tubular body 24 has no cylindrical portion 29 and, therefore, comprises the sole conical portion 28. According to a further embodiment which is not shown herein, the cylindrical portion 29 could be replaced by a further conical portion having a smaller taper (convergence) than a taper (convergence) of the conical portion 28.

In the embodiment shown in the accompanying figures, the fuel injector 9 is configured to spray at least part of the fuel against the cylindrical portion 29 (or against the further conical portion) of the outer tubular body 24; in particular, the fuel injector 9 is configured to spray the largest part (almost the entirety) of the fuel against the cylindrical portion 29 (or against the further conical portion) of the outer tubular body 24. According to a different embodiment, the fuel injector 9 is configured to spray at least part of the fuel against the cylindrical portion 29 (or against the further conical portion) of the outer tubular body 24 and at least part of the fuel against the conical portion 28 of the outer tubular body 24; for example, the fuel injector 9 is configured to spray approximately half the fuel against the conical portion 28 of the outer tubular body 24 and approximately half the fuel against the cylindrical portion 29 (or against the further conical portion) of the outer tubular body 24. According to a further embodiment, the fuel injector 9 is configured to spray at least part of the fuel against the conical portion 28 of the outer tubular body 24; in particular, the fuel injector 9 is configured to spray the largest part (almost the entirety) of the fuel against the conical portion 28 of the outer tubular body 24.

According to FIG. 2, an axial distance X (namely, measured along the longitudinal axis 13 of the tubular body 12) between the spray tip of the fuel injector 9 from which fuel flows out (namely, the injection point of the fuel injector 9) and a longitudinal axis 30 of the spark plug 10 ranges from 33% to 100% of an inner diameter D of the tubular body 12 (namely, of the diameter D of the combustion chamber 7); preferably, the axial distance X ranges from 50% to 100% of the inner diameter D of the tubular body 12 and, in particular, the axial distance X ranges from 60% to 90% of the inner diameter D of the tubular body 12. It should be pointed out that the tubular body 12 preferably has a circular cross section and, therefore, there are no doubts on how the inner diameter D of the tubular body 12 has to be measured in order to assess the axial distance X; if, on the contrary, the tubular body 12 had an elliptical cross section, the larger size would be one to be taken into account as diameter D of the tubular body 12 in order to assess the axial distance X.

According to FIGS. 7 and 8, the spark plug 10 has one single inner electrode 31 and one single outer electrode 32; according to variants shown in FIGS. 9 and 10, the spark plug 10 has one single inner electrode 31 and two outer electrodes 32 (FIG. 9) or one single inner electrode 31 and four outer electrodes 32 (FIG. 10); according to a further variant which is not shown herein, there could be three outer electrodes 32.

Figure 4:
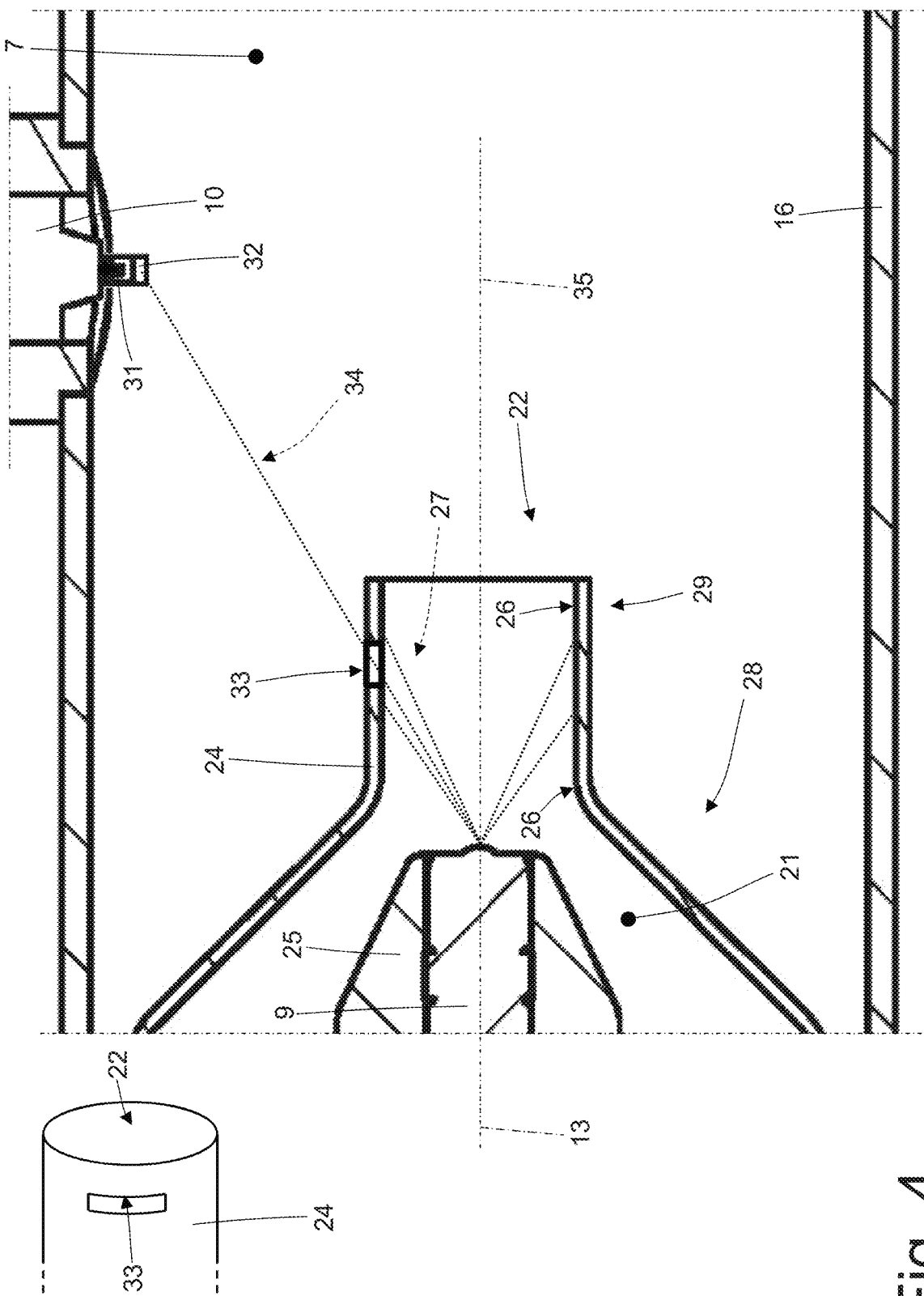
FIG. 4 is a view, on a larger scale, of a detail of FIG. 2 showing a different embodiment.

According to FIG. 4, the outer tubular body 24 has a through opening 33 (namely, a slit), through which the spray tip of the fuel injector 9 from which fuel flows out (namely, the injection point of the fuel injector 9) directly aims at the electrodes 31 and 32 of the spark plug 10. Thanks to the presence of the through opening 33, a limited part 34 of the fuel jet 27 emitted by the fuel injector 9 does not hit the outer tubular body 24, but goes through the outer tubular body 24 until it directly reaches the electrodes 31 and 32 of the spark plug 10. In other words, thanks to the presence of the through opening 33, the limited part 34 of the fuel jet 27 directly "wets" the electrodes 31 and 32 of the spark plug 10 so as to create, around the electrodes 31 and 32 of the spark plug 10, a local fuel excess (namely, a locally richer mixture), which favours the ignition of the flame and, hence, supports a quicker propagation of the flame to the rest of the mixture.

According to FIG. 4, the through opening 33 is shaped like a slit, namely has a circumferential size that is greater than an axial size; preferably, the circumferential side of the through opening 33 angularly ranges from 30° to 60°.

According to FIGS. 8, 9 and 10, the outer electrode 32 (or the outer electrodes 32) of the spark plug 10 is oriented so as not to obstruct (intercept) the limited part 34 of the fuel jet 27 moving towards the inner electrode 31; namely, the outer electrode 32 (or the outer electrodes 32) of the spark plug 10 is oriented so as not to shade (screen) the inner electrode 31 from the limited part 34 of the fuel jet 27. As a consequence, the spark generated between the two electrodes 31 and 32 is hot shaded (screened) by the outer electrode 32 relative to the limited part 34 of the fuel jet 27. FIGS. 8 and 9 show both parts 34 of the fuel jet 27 that have a correct orientation relative to the electrode 32 (namely, which are not screened by the electrode 32) and parts 34 of the fuel jet 27 that have a wrong orientation relative to the electrode 32 (namely, which are screened by the electrode 32) and, for this reason, are "cancelled" by means of an "X".

Figure 11:
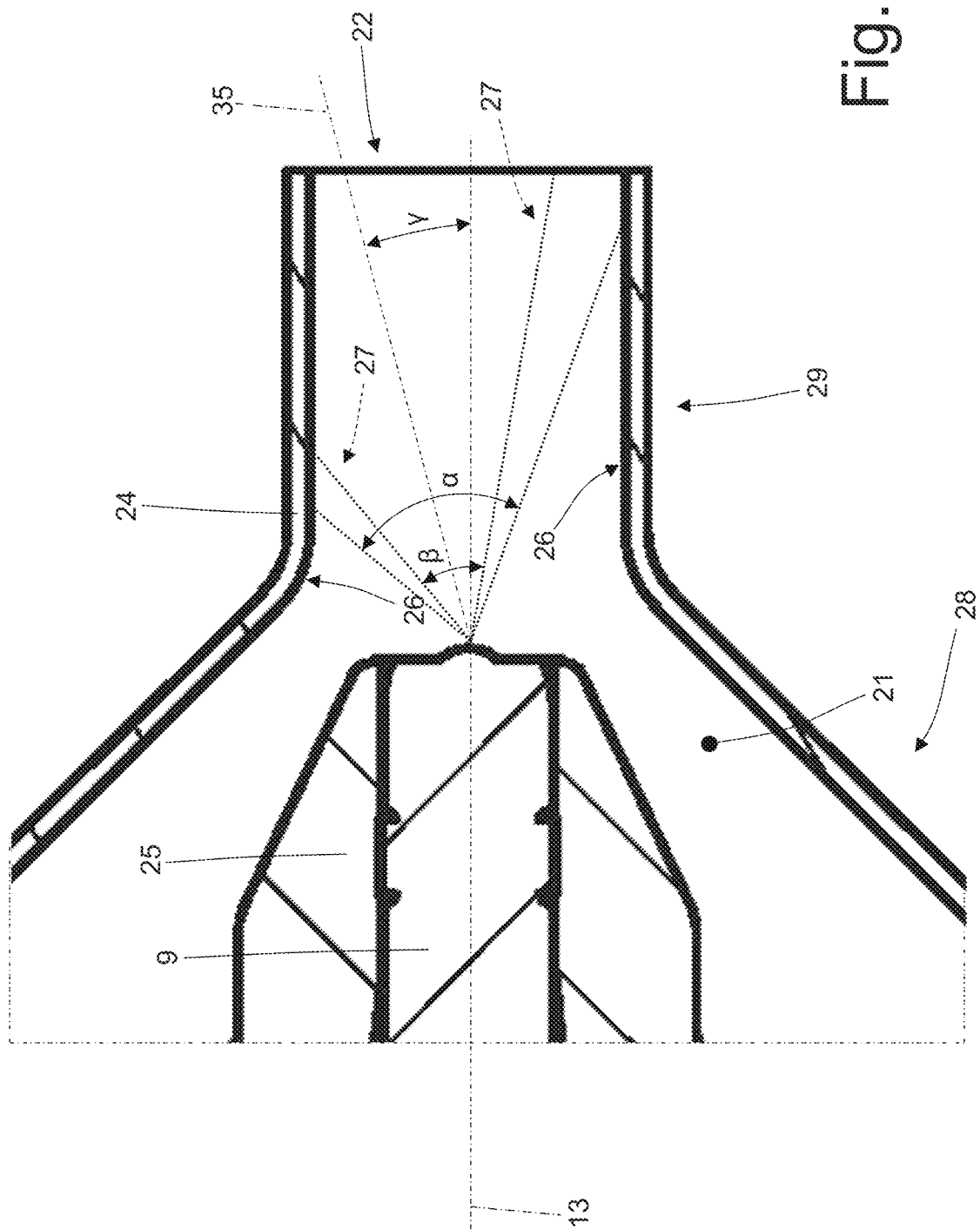
FIG. 11 is a view, on a larger scale, of a detail of FIG. 2 according to a further embodiment.

In the embodiments shown in FIGS. 3 and 4, the fuel jet 27 emitted by the fuel injector 9 is perfectly symmetrical relative to the longitudinal axis 13 of the tubular body 12 (and of the fuel injector 9); namely, the longitudinal axis 13 of the tubular body 12 coincides with a central symmetry axis 35 of the fuel jet 27. On the other hand, in the embodiment shown in FIG. 11, the fuel jet 27 emitted by the fuel injector 9 is asymmetrical relative to the longitudinal axis 13 of the tubular body 12 (and of the fuel injector 9) and, hence, the fuel jet 27 is inclined towards the electrodes 31 and 32 of the spark plug 10; namely, the central symmetry axis 35 of the fuel jet 27 forms an angle γ (other than zero) with the longitudinal axis 13 of the tubular body 12. According to a preferred embodiment, the central symmetry axis 35 of the fuel jet 27 is inclined towards the electrodes 31 and 32 of the spark plug 10 so as to form, with the longitudinal axis 13 of the tubular body 12, the angle γ having a width ranging from 5° to 20° and preferably equal to approximately 13-15°. Inclining the fuel jet 27 towards the electrodes 31 and 32 of the spark plug 10 permits the creation, around the electrodes 31 and 32 of the spark plug 10, of a local fuel excess (namely, a locally richer mixture), which favours the ignition of the flame and, hence, supports a quicker propagation of the flame to the rest of the mixture.

According to a preferred embodiment, the heating device 6 comprises a control unit 36 (schematically shown in FIG. 1), which is configured to control the entire operation of the heating device 6, namely to control the fan 8, the injector 9 and the spark plug 10 in a coordinated manner so as to reach, as efficiently and effectively as possible, the desired object (namely, quickly heating the treatment device 5 without damaging the treatment device 5 due to an excess temperature).

According to a possible embodiment shown in FIG. 1, the heating device 6 comprises a temperature sensor 37, which is arranged along the outlet duct 11 so as to measure the temperature of the hot air flowing through the outlet duct 11; alternatively, the heating device 6 comprises a temperature sensor 38, which is arranged along the exhaust duct 3 downstream of the point in which the outlet duct 11 branches off (and upstream of the treatment device 5) so as to measure the temperature of the mixture of exhaust gases and hot air flowing through the exhaust duct 3. Generally, there is only one of the two temperature sensors 37 and 38, even if, in special applications, both temperature sensors 37 and 38 could be present. The control unit 36 uses the reading of the temperature sensor 37 or 38 in order to control (if necessary, by means of a feedback control) the combustion in the combustion chamber 7 so as to quickly heat the treatment device 5 without damaging the treatment device 5 due to an excess temperature.

The embodiments described herein can be combined with one another, without for this reason going beyond the scope of protection of the invention.

The heating device 6 described above has numerous advantages.

First of all, the heating device 6 described above ensures, in all operating conditions (especially when a large quantity of fuel is injected in order to develop a large quantity of heat), a complete fuel combustion (namely, without introducing unburnt fuel into the exhaust duct 3) thanks to an ideal mixing between the oxidizing air introduced by the nozzle 22 of the feeding channel 21 and the fuel injected by the fuel injector 9.

Furthermore, the heating device 6 described above has a high thermal power in relation to its overall dimensions; namely, even though it is relatively small, the heating device 6 described above generates a high thermal power.

Finally, the heating device 6 described above is simple and economic to be manufactured, since it consists of a few parts with a non-complicated shape and easy to be joined with standard welds and joints.

LIST OF THE REFERENCE NUMBERS OF THE FIGURES 1 exhaust system
2 internal combustion engine
3 exhaust duct
4 silencer
5 treatment device
6 heating device
7 combustion chamber
8 fan
9 fuel injector
10 spark plug
11 outlet duct
12 tubular body
13 longitudinal axis
14 base wall
15 base wall
16 side wall
17 outlet opening
18 inlet opening
19 inlet duct
20 non-return valve
21 feeding channel
22 nozzle
23 static mixer
24 outer tubular body
25 inner tubular body
26 inner surface
27 fuel jet
28 conical portion
29 cylindrical portion
30 longitudinal axis
31 inner electrode 32 outer electrode
33 through opening
34 part
35 symmetry axis
36 control unit
37 temperature sensor
temperature sensor
α angle
β angle
γ angle
X distance
D diameter

The invention claimed is:

1. A heating device (6) for an exhaust system (1) of an internal combustion engine (2); the heating device (6) comprises:
   a tubular body (12), where a combustion chamber (7) is obtained on the inside;
   a fuel injector (9), which is mounted through a base wall (14) of the tubular body (12) so as to inject fuel into the combustion chamber (7);
   at least one inlet opening (18), which can be connected to a fan (8) so as to receive an air flow, which is directed to the combustion chamber (7) and gets mixed with the fuel;
   a feeding channel (21), which is entirely contained inside the tubular body (12), receives air from the inlet opening (18), surrounds an end portion of the fuel injector (9) and ends with a nozzle (22), which is arranged around a spray tip of the fuel injector (9);
   a spark plug (10), which is mounted through a side wall (16) of the tubular body (12) so as to trigger the combustion of a mixture of air and fuel; and
   a static mixer (23), which is shaped like an annulus, is arranged along the feeding channel (21) and around the fuel injector (9) and is configured to generate turbulences, in particular a swirling motion, in the air flowing towards the nozzle (22);
   wherein an axial distance (X), namely measured along a longitudinal axis (13) of the tubular body (12), between the spray tip of the fuel injector (9) and a longitudinal axis (30) of the spark plug (10) ranges from 33% to 100% of an inner diameter (D) of the tubular body (12).

2. The heating device (6) according to claim 1, wherein the axial distance (X) ranges from 50% to 100% of the inner diameter (D) of the tubular body (12).

3. The heating device (6) according to claim 1, wherein the axial distance (X) ranges from 60% to 90% of the inner diameter (D) of the tubular body (12).

4. The heating device (6) according to claim 1, wherein the fuel injector (9) is configured to spray at least part of the fuel against an inner surface (26) of the feeding channel (21).

5. The heating device (6) according to claim 4, wherein the injector is configured to spray at least 80% of the fuel against the inner surface (26) of the feeding channel (21).

6. The heating device (6) according to claim 4, wherein the injector is configured to spray at least 90% of the fuel against the inner surface (26) of the feeding channel (21).

7. The heating device (6) according to claim 1, wherein the injector (9) is configured to emit a fuel jet (27) having a conical shape hollow at the centre, namely having a cross section shaped like an annulus.

8. The heating device (6) according to claim 7, wherein an outer surface of the fuel jet (27) has an opening angle (α) of approximately 70° and an inner surface of the fuel jet (27) has an opening angle (β) of approximately 50°.

9. The heating device (6) according to claim 1, wherein a fuel jet (27) emitted by the fuel injector (9) is asymmetric relative to the longitudinal axis (13) of the tubular body (12), so that the fuel jet (27) is inclined towards electrodes (31, 32) of the spark plug (10).

10. The heating device (6) according to claim 9, wherein a central symmetry axis (35) of the fuel jet (27) forms an angle (γ) other than zero with the longitudinal axis (13) of the tubular body (12).

11. The heating device (6) according to claim 10, wherein the angle (γ) between the central symmetry axis (35) of the fuel jet (27) and the longitudinal axis (13) of the tubular body (12) ranges from 5° to 20°.

12. The heating device (6) according to claim 1, wherein the fuel injector (9) is of the swirl type and imparts a rotary swirling motion to the fuel.

13. The heating device (6) according to claim 1, wherein:
   the feeding channel (21) is delimited, on the outside, by an outer tubular body (24) and is delimited, on the inside, by an inner tubular body (25), which surrounds the fuel injector (9) and contains, on the inside, the fuel injector (9); and
   the outer tubular body (24), at first, is separate from and independent of the tubular body (12) and is entirely contained in the tubular body (12).

14. An exhaust system (1) of an internal combustion engine (2); the exhaust system (1) comprises:
   an exhaust duct (3), which originates from an exhaust manifold of the internal combustion engine (2) and ends with a silencer (4), from which exhaust gases are released into the atmosphere;
   an exhaust gas treatment device (5), which is arranged along the exhaust duct (3); and
   a heating device (6), which is connected to the exhaust duct (3) upstream of the treatment device (5) by means of an outlet duct (11) coming out of the exhaust duct (3), is designed to generate, by burning fuel, a hot air flow and is manufactured according to claim 1.

15. The exhaust system (1) according to claim 14, wherein the heating device (6) comprises:
   a temperature sensor (37, 38), which is arranged along the outlet duct (11) or along the exhaust duct (3) downstream of the point in which the outlet duct (11) branches off; and
   a control unit (36), which adjusts the combustion in the heating device (6) also depending on the measure provided by the temperature sensor (37, 38).

16. A heating device (6) for an exhaust system (1) of an internal combustion engine (2);
   the heating device (6) comprises:
   a tubular body (12), where a combustion chamber (7) is obtained on the inside;
   a fuel injector (9), which is mounted through a base wall (14) of the tubular body (12) so as to inject fuel into the combustion chamber (7);
   at least one inlet opening (18), which can be connected to a fan (8) so as to receive an air flow, which is directed to the combustion chamber (7) and gets mixed with the fuel;
   a feeding channel (21), which is entirely contained inside the tubular body (12), receives air from the inlet opening (18), surrounds an end portion of the fuel injector (9) and ends with a nozzle (22), which is arranged around a spray tip of the fuel injector (9); and
   a spark plug (10), which is mounted through a side wall (16) of the tubular body (12) so as to trigger the combustion of a mixture of air and fuel;

wherein an axial distance (X), namely measured along a longitudinal axis (13) of the tubular body (12), between the spray tip of the fuel injector (9) and a longitudinal axis (30) of the spark plug (10) ranges from 33% to 100% of an inner diameter (D) of the tubular body (12); and wherein the fuel injector (9) is configured to spray at least 80% of the fuel against an inner surface (26) of the feeding channel (21).

17. The heating device (6) according to claim 16, wherein the injector is configured to spray at least 90% of the fuel against the inner surface (26) of the feeding channel (21).

18. A heating device (6) for an exhaust system (1) of an internal combustion engine (2);
the heating device (6) comprises:
a tubular body (12), where a combustion chamber (7) is obtained on the inside;
a fuel injector (9), which is mounted through a base wall (14) of the tubular body (12) so as to inject fuel into the combustion chamber (7);
at least one inlet opening (18), which can be connected to a fan (8) so as to receive an air flow, which is directed to the combustion chamber (7) and gets mixed with the fuel;
a feeding channel (21), which is entirely contained inside the tubular body (12), receives air from the inlet opening (18), surrounds an end portion of the fuel injector (9) and ends with a nozzle (22), which is arranged around a spray tip of the fuel injector (9); and
a spark plug (10), which is mounted through a side wall (16) of the tubular body (12) so as to trigger the combustion of a mixture of air and fuel;
wherein an axial distance (X), namely measured along a longitudinal axis (13) of the tubular body (12), between the spray tip of the fuel injector (9) and a longitudinal axis (30) of the spark plug (10) ranges from 33% to 100% of an inner diameter (D) of the tubular body (12); and
wherein a fuel jet (27) emitted by the fuel injector (9) is asymmetric relative to the longitudinal axis (13) of the tubular body (12), so that the fuel jet (27) is inclined towards electrodes (31, 32) of the spark plug (10) and wherein a central symmetry axis (35) of the fuel jet (27) forms an angle (γ) other than zero with the longitudinal axis (13) of the tubular body (12).

19. The heating device (6) according to claim 18, wherein the angle (γ) between the central symmetry axis (35) of the fuel jet (27) and the longitudinal axis (13) of the tubular body (12) ranges from 5° to 20°.

20. A heating device (6) for an exhaust system (1) of an internal combustion engine (2);
the heating device (6) comprises:
a tubular body (12), where a combustion chamber (7) is obtained on the inside;
a fuel injector (9), which is mounted through a base wall (14) of the tubular body (12) so as to inject fuel into the combustion chamber (7);
at least one inlet opening (18), which can be connected to a fan (8) so as to receive an air flow, which is directed to the combustion chamber (7) and gets mixed with the fuel;
a feeding channel (21), which is entirely contained inside the tubular body (12), receives air from the inlet opening (18), surrounds an end portion of the fuel injector (9) and ends with a nozzle (22), which is arranged around a spray tip of the fuel injector (9); and
a spark plug (10), which is mounted through a side wall (16) of the tubular body (12) so as to trigger the combustion of a mixture of air and fuel;
wherein an axial distance (X), namely measured along a longitudinal axis (13) of the tubular body (12), between the spray tip of the fuel injector (9) and a longitudinal axis (30) of the spark plug (10) ranges from 33% to 100% of an inner diameter (D) of the tubular body (12); and
wherein the fuel injector (9) is of the swirl type and imparts a rotary swirling motion to the fuel.

21. A heating device (6) for an exhaust system (1) of an internal combustion engine (2); the heating device (6) comprises:
a tubular body (12), where a combustion chamber (7) is obtained on the inside;
a fuel injector (9), which is mounted through a base wall (14) of the tubular body (12) so as to inject fuel into the combustion chamber (7);
at least one inlet opening (18), which can be connected to a fan (8) so as to receive an air flow, which is directed to the combustion chamber (7) and gets mixed with the fuel;
a feeding channel (21), which is entirely contained inside the tubular body (12), receives air from the inlet opening (18), surrounds an end portion of the fuel injector (9) and ends with a nozzle (22), which is arranged around a spray tip of the fuel injector (9); and
a spark plug (10), which is mounted through a side wall (16) of the tubular body (12) so as to trigger the combustion of a mixture of air and fuel;
wherein an axial distance (X), namely measured along a longitudinal axis (13) of the tubular body (12), between the spray tip of the fuel injector (9) and a longitudinal axis (30) of the spark plug (10) ranges from 33% to 100% of an inner diameter (D) of the tubular body (12);
wherein the feeding channel (21) is delimited, on the outside, by an outer tubular body (24) and is delimited, on the inside, by an inner tubular body (25), which surrounds the fuel injector (9) and contains, on the inside, the fuel injector (9); and
wherein the outer tubular body (24), at first, is separate from and independent of the tubular body (12) and is entirely contained in the tubular body (12).

* * * * *